(12) United States Patent
Reddehase et al.

(10) Patent No.: US 11,780,495 B2
(45) Date of Patent: Oct. 10, 2023

(54) WHEEL SUSPENSION FOR A VEHICLE

(71) Applicant: ZF FRIEDRICHSHAFEN AG, Friedrichshafen (DE)

(72) Inventors: Günter Reddehase, Brockum (DE); Janina Altmeppen, Ostercappeln (DE); Frank Scheper, Loeningen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 79 days.

(21) Appl. No.: 17/624,808

(22) PCT Filed: Jun. 2, 2020

(86) PCT No.: PCT/EP2020/065133
§ 371 (c)(1),
(2) Date: Jan. 4, 2022

(87) PCT Pub. No.: WO2021/004695
PCT Pub. Date: Jan. 14, 2021

(65) Prior Publication Data
US 2022/0258798 A1 Aug. 18, 2022

(30) Foreign Application Priority Data
Jul. 5, 2019 (DE) ...................... 10 2019 209 915.7

(51) Int. Cl.
*B62D 7/18* (2006.01)

(52) U.S. Cl.
CPC .......... *B62D 7/18* (2013.01); *B60G 2200/144* (2013.01); *B60G 2200/44* (2013.01);
(Continued)

(58) Field of Classification Search
CPC ............... B62D 7/18; B60G 2200/144; B60G 2200/44; B60G 2204/416;
(Continued)

(56) References Cited

U.S. PATENT DOCUMENTS

| 1,464,901 A | * | 8/1923 | Conner | .................... | B62D 7/18 280/93.512 |
| 1,474,057 A | * | 11/1923 | Pridemore | ............... | B62D 7/18 384/396 |

(Continued)

FOREIGN PATENT DOCUMENTS

| DE | 19631946 | 2/1998 |
| DE | 102013213075 | 1/2015 |

(Continued)

OTHER PUBLICATIONS

Search Report dated May 6, 2020 issued in German Patent Application No. 10 2019 209 915.7.

(Continued)

*Primary Examiner* — Paul N Dickson
*Assistant Examiner* — Timothy Wilhelm
(74) *Attorney, Agent, or Firm* — Cozen O'Connor

(57) ABSTRACT

Wheel suspension has a steering knuckle support with two hole openings opposed to one another in an axial direction and form openings of a mounting hole, two axle pins spaced apart axially, extend in axial direction and engage in the mounting hole through the hole openings, and a chassis component supported at axial end portions of the axle pins to be swivelable relative to the steering knuckle. A first contact area at the hole openings has a conical inner circumferential surface. The conical inner circumferential surfaces of the first contact areas narrow in diameter toward one another in axial direction. The axle pins have a second contact area with a conical outer circumferential surface that narrow in diameter toward one another in axial direction and contact the conical inner circumferential surfaces of the first contact areas.

13 Claims, 5 Drawing Sheets

(52) U.S. Cl.
CPC .. *B60G 2204/416* (2013.01); *B60G 2204/418* (2013.01); *B60G 2206/50* (2013.01); *B60G 2206/72* (2013.01); *B60G 2206/8207* (2013.01)

(58) Field of Classification Search
CPC .......... B60G 2204/418; B60G 2206/50; B60G 2206/72; B60G 2206/8207; B60G 2300/026
See application file for complete search history.

(56) References Cited

U.S. PATENT DOCUMENTS

| | | | | |
|---|---|---|---|---|
| 1,483,282 | A * | 2/1924 | Coston | B62D 7/18 403/150 |
| 2,208,189 | A * | 7/1940 | Jones | B62D 7/18 280/93.512 |
| 2,428,651 | A * | 10/1947 | Buese | B62D 7/18 301/1 |
| 3,563,564 | A * | 2/1971 | Bartkowiak | B62D 7/18 403/126 |
| 4,690,418 | A * | 9/1987 | Smith | F16C 25/02 280/93.512 |
| 4,798,260 | A * | 1/1989 | Nakata | B62D 17/00 74/424 |
| 4,862,760 | A * | 9/1989 | Kuwahara | F16H 59/0278 403/324 |
| 4,915,530 | A * | 4/1990 | Tomlinson | B62D 7/18 403/162 |
| 5,192,100 | A * | 3/1993 | Rumpel | B60G 15/07 280/124.154 |
| 5,350,183 | A * | 9/1994 | Shealy | B62D 7/18 403/379.4 |
| 6,029,986 | A * | 2/2000 | Bodin | B62D 7/18 301/132 |
| 6,499,752 | B1 * | 12/2002 | Davis | B62D 7/18 280/93.512 |
| 6,527,468 | B1 | 3/2003 | Lindquist et al. | |
| 6,607,203 | B2 * | 8/2003 | Bodin | F16C 21/00 280/124.125 |
| 6,722,994 | B2 * | 4/2004 | Woods | B60G 7/00 180/359 |
| 6,851,688 | B2 * | 2/2005 | Barry | B62D 7/18 403/143 |
| 7,063,342 | B2 * | 6/2006 | Seki | B60G 7/02 384/488 |
| 7,097,184 | B2 * | 8/2006 | Kapaan | B62D 15/02 280/93.512 |
| 7,163,217 | B2 * | 1/2007 | Bodin | B62D 7/18 280/93.511 |
| 7,393,152 | B2 * | 7/2008 | Sellers | F16C 11/0604 403/368 |
| 7,503,739 | B2 * | 3/2009 | Yoo | B62D 7/18 411/351 |
| 7,740,253 | B2 * | 6/2010 | Ziech | B62D 7/18 280/93.511 |
| 9,533,708 | B2 * | 1/2017 | Cao | F16C 11/045 |
| 9,579,974 | B2 * | 2/2017 | Bittlingmaier | B60K 17/303 |
| 9,643,645 | B2 * | 5/2017 | Dendis | B62D 7/18 |
| 2007/0065227 | A1 * | 3/2007 | Sellers | B60G 7/005 403/122 |

FOREIGN PATENT DOCUMENTS

| | | |
|---|---|---|
| EP | 1513719 | 8/2007 |
| EP | 2246204 | 11/2010 |

OTHER PUBLICATIONS

Office Action of the corresponding German Patent Application No. 10 2019 209 915.7.

* cited by examiner

WHEEL SUSPENSION FOR A VEHICLE

CROSS REFERENCE TO RELATED APPLICATIONS

This is a U.S. national stage of Application No. PCT/EP2020/065133 filed Jun. 2, 2020. Priority is claimed on German Application No. DE 10 2019 209 915.7 filed Jul. 5, 2019 the content of which is incorporated herein by reference.

BACKGROUND OF THE INVENTION

1. Field of the Invention

The disclosure is directed to a wheel suspension for a vehicle, with a steering knuckle support in which are provided two hole openings opposed to one another in an axial direction and form openings of one or at least one mounting hole provided in the steering knuckle support and which extends in axial direction, two axle pins arranged to be spaced apart axially, extend in axial direction and engage in the mounting hole through the hole openings, and a chassis component supported at axial end portions of the axle pins so as to be swivelable relative to the steering knuckle support around a swiveling axis extending in axial direction.

2. Description of Related Art

EP 1 513 719 B1 discloses an arrangement for the steerable suspension of a motor vehicle wheel comprising a first bearing and a second bearing arranged at a supporting unit that forms a geometrical axis of rotation around which a motor vehicle wheel is supported in bearings to be steerable with respect to the supporting unit which has a supporting surface. The first bearing and second bearing have, in each instance, an inner race with an outer, radially oriented surface, which is arranged such that they adjoin the supporting surface and abut against the latter in order to absorb forces acting radially with respect to the geometrical axis of rotation. The supporting surface of the supporting unit is cylindrically contoured and simultaneously forms the inner wall of a through-bore extending in direction of the geometrical axis of rotation. The surfaces of the two inner races that adjoin the supporting surfaces and abut against the latter are likewise cylindrically contoured. Specifically, the two surfaces of the inner races that adjoin the supporting surfaces and abut against the latter form neck portions of the inner races, these neck portions being inserted into opposed hole openings of the through-bore.

When steerable suspensions of motor vehicle wheels are mounted in this manner, an impermissibly high area pressure can occur in the supporting surface of the supporting unit during driving operation, particularly if high lateral forces act on the motor vehicle wheel. In particular, this poses a risk for the two edges of the through-bore that are opposed in direction of the axis of rotation and at which this through-bore emerges from the supporting unit. The above-mentioned impermissibly high area pressures can cause plastic deformations of the hole openings of the through-bore and lead to a safety-critical loosening of the steerable suspension of the vehicle wheel.

SUMMARY OF THE INVENTION

In view of the foregoing, it is an object of one aspect of the invention to provide a bearing support of the steerable motor vehicle wheel suspension in which impermissibly high area pressure values are prevented in the region of the hole openings of the through-bore.

The wheel suspension for a vehicle mentioned in the introductory part with a steering knuckle support in which are provided two hole openings which are opposed to one another in an axial direction and form openings of one or at least one mounting hole which is provided in the steering knuckle support and which extends in axial direction, two axle pins which are arranged to be spaced apart axially, extend in axial direction and engage in the mounting hole through the hole openings, and a chassis component which is supported at axial end portions of the axle pins so as to be swivelable relative to the steering knuckle support around a swiveling axis extending in axial direction is further developed in particular in that a first contact area at the hole openings is provided with a conical inner circumferential surface, and the conical inner circumferential surfaces of the first contact areas narrow in diameter toward one another in axial direction, and the axle pins have in each instance a second contact area with a conical outer circumferential surface, and the conical outer circumferential surfaces of the second contact areas narrow in diameter toward one another in axial direction and contact the conical inner circumferential surfaces of the first contact areas.

The area pressure occurring in the region of the hole openings can be reduced by the conical surfaces. This results in a wheel suspension that is less prone to wear overall and which accordingly operates more reliably.

In particular, "radial direction" refers to a direction, or any direction, extending transverse to the swiveling axis and/or transverse to the axial direction. The conical inner circumferential surfaces of the first contact areas and the conical outer circumferential surfaces of the second contact areas are preferably rotationally symmetrical with respect to an axis of symmetry extending in axial direction. The mounting hole is preferably rotationally symmetrical with respect to the axis of symmetry. The axis of symmetry advantageously extends through the center of the hole openings. The swiveling axis is, or forms, the axis of symmetry in particular.

The steering knuckle support is preferably made from metal, particularly from a ferrous material such as steel, for example. The first contact areas are formed, e.g., by the steering knuckle support and/or by the material of the steering knuckle support. For example, the steering knuckle support is made from a hardened material, e.g., cast iron with spheroidal graphite, in the contact area or at least in the contact area.

According to one aspect of the invention, conical washers, particularly two conical washers at which the first contact areas and/or the conical inner circumferential surfaces of the first contact areas are provided, are inserted in the hole openings. The first contact areas are preferably formed by conical washers, preferably two conical washers, inserted in the hole openings or by the conical washers inserted in the hole openings. For example, the first contact areas are formed by the material of the conical washers. The conical inner circumferential surfaces of the first contact areas are preferably provided at the conical washers. Accordingly, it is possible to produce only the conical washers, and not the entire steering knuckle support, from a high-strength material. The conical washers are preferably made of metal, particularly of a ferrous material, e.g., steel. For example, the conical washers comprise a high-strength heat-treated steel. The conical washers are preferably rotationally symmetrical with respect to the axis of symmetry.

The axle pins are preferably made of metal, particularly a ferrous material, e.g., steel. For example, the axle pins are made of a high-strength heat-treated steel. The second contact areas are formed, e.g., by the axle pins and/or by the material of the axle pins. The axle pins are preferably rotationally symmetrical with respect to the axis of symmetry.

According to one aspect of the invention, each of the conical washers is connected to the steering knuckle support so as to be rigid against rotation, particularly with respect to the swiveling axis. The conical washers preferably have a cylindrical tube portion at their respective ends, particularly axial ends which face one another preferably in axial direction, this cylindrical tube portion contacting the steering knuckle support, e.g., in the area of the hole openings and/or inside the mounting hole, by its outer circumferential surface, preferably while forming an interference fit. This arrangement of the conical washers can prevent twisting of the conical washers, for example, relative to the steering knuckle support. These anti-rotation elements are carried out in particular by frictional engagement. Alternatively, anti-rotation elements by positive engagement is possible, for example, by a spline. When the conical washers have a cylindrical tube portion at their axial ends that face one another in axial direction, which cylindrical tube portion contacts the steering knuckle support in the area of the hole openings and/or inside the mounting hole by its outer circumferential surface while forming an interference fit, the advantage consists in that the steering knuckle support together with the conical washers pressed into the latter forms a preassembled constructional unit, which has advantageous results in the assembly process. A further advantage of the above-mentioned interference fit is that when the axle pins are screwed into the mounting hole the conical washers are prevented from rotating along with the latter.

According to one aspect of the invention, the steering knuckle support has at the hole openings a third contact area with a conical inner circumferential surface, and the conical inner circumferential surfaces of the third contact areas narrow in diameter toward one another in axial direction, and the conical washers have in each instance a fourth contact area with a conical outer circumferential surface, and the conical outer circumferential surfaces of the fourth contact areas narrow in diameter toward one another in axial direction and contact the conical inner circumferential surfaces of the third contact areas. The third contact areas are formed, e.g., by the steering knuckle support and/or by the material of the steering knuckle support. Further, the fourth contact areas are formed, e.g., by the conical washers and/or by the material of the conical washers. The conical inner circumferential surfaces of the third contact areas and the conical outer circumferential surfaces of the fourth contact areas are preferably rotationally symmetrical with respect to the axis of symmetry.

According to a further development, it is provided that the steering knuckle support has in each instance, particularly inside of the mounting hole in the area of the hole openings, a fifth contact area with a cylindrical inner circumferential surface which axially adjoins the respective third contact area, and the fifth contact areas are arranged between the third contact areas. Each axle pin advantageously has a sixth contact area with a cylindrical outer circumferential surface axially adjoining the respective second contact area, and the sixth contact areas are arranged between the second contact areas. The conical washers preferably have at their ends, particularly axial ends which face one another preferably in axial direction, the cylindrical tube portion or a cylindrical tube portion which contacts the cylindrical inner circumferential surface of the respective fifth contact area and the cylindrical outer circumferential surface of the respective sixth contact area preferably while forming, respectively, the interference fit or an interference fit. The fifth contact areas are formed, e.g., by the steering knuckle support and/or by the material of the steering knuckle support. Further, the sixth contact areas are formed, e.g., by the axle pins and/or by the material of the axle pins. The fifth contact areas preferably have a larger diameter than an area of the mounting hole situated between the fifth contact areas. The cylindrical inner circumferential surfaces of the fifth contact areas and the cylindrical outer circumferential surfaces of the sixth contact areas are preferably rotationally symmetrical with respect to the axis of symmetry.

The axle pins are, e.g., screwed, to the steering knuckle support and/or into the steering knuckle support. The axle pins are preferably screwed into the hole openings and/or into the mounting hole and/or through the hole openings into the mounting hole. Accordingly, the axle pins are preferably connected to the steering knuckle support and/or screwed to the steering knuckle support and/or screwed into the steering knuckle support. In particular, every axle pin has an outer thread, e.g., a fine thread. The steering knuckle support preferably has, in the mounting hole, an inner thread, e.g., a fine thread, or one inner thread per axle pin. Each axle pin is preferably screwed into the inner thread or into the respective inner thread of the steering knuckle support by its outer thread. The screw connections between the steering knuckle support and the axle pin and/or the screw connection between each axle pin and the steering knuckle support are/is self-locking in particular. The threads of the axle pins preferably run in the same direction. For example, either both of the axle pins have a right-hand thread or both of the axle pins have a left-hand thread.

The at least one mounting hole can be formed, e.g., by blind holes located one behind the other in axial direction. However, the mounting hole is preferably an individual hole. In particular, the mounting hole is a through-hole. The hole openings are preferably formed by axial ends of the mounting hole.

According to one aspect of the invention, the axle pins each have an axially through-going cavity. An inner part is preferably provided, which inner part extends in axial direction through the through-going cavities and/or through the axle pins. The inner part is preferably made from metal, in particular a ferrous material, e.g., steel. The inner part is preferably rod-shaped. For example, the inner part forms a threaded rod. In particular, the inner part extends in axial direction.

Axial securing elements, particularly two axial securing elements, are preferably provided at the inner part, the axle pins being arranged therebetween and accordingly secured to the inner part in axial direction, particularly by positive engagement. Accordingly, the axle pins can be held together by the inner part itself should at least one of the axle pins disengage from the steering knuckle support.

The inner part is preferably connected to one of the axle pins so as to be rigid against rotation, particularly with respect to the swiveling axis. Accordingly, it is possible, for example, to axially preload the inner part by screwing without the inner part itself rotating along. The inner part advantageously extends in axial direction through the mounting hole.

According to one aspect of the invention, a recess with an inner circumferential surface which is nonround in cross section is provided in each instance in the front sides of the axial end portions of the axle pins, this inner circumferential surface being engaged by a correspondingly shaped outer circumferential surface of an insert inserted into the recess, surrounds the inner part and is preferably connected to the inner part so as to be rigid against rotation, particularly with respect to the swiveling axis and/or the axis of symmetry. The nonround inner circumferential surface of each recess is preferably a polygonal, e.g., hexagonal, inner circumferential surface. Further, the correspondingly shaped outer circumferential surface of each insert is, e.g., a polygonal, e.g., hexagonal, outer circumferential surface.

Preferably, each insert is connected to the respective axle pin so as to be rigid against rotation, particularly with respect to the swiveling axis and/or the axis of symmetry, in that the outer circumferential surface of each insert engages at the inner circumferential surface of the respective recess. One insert, or at least one insert, or every insert is formed as a separate component part, for example. In this case, the insert, or the at least one insert or every insert is secured in axial direction at the inner part, e.g., by one, or at least one, additional element. The additional element or every additional element is or comprises, e.g., a nut which is screwed on to an end of the inner part. Further, one or another of the inserts can be formed integral with the inner part and can form, e.g., a screw head of the inner part.

According to one aspect of the invention, one insert or at least one insert or each of the inserts has a nonround inner circumferential surface which engages or engage, respectively, a correspondingly shaped outer circumferential surface of an end region of the inner part. The nonround inner circumferential surface of the insert or of each of the inserts has, e.g., a flat portion. Further, e.g., the correspondingly shaped outer circumferential surface of the end region, or of each end region, of the inner part has a flat portion. Preferably, the insert or each insert is connected to the inner part so as to be rigid against rotation, particularly with respect to the swiveling axis and/or the axis of symmetry, in that the inner circumferential surface of the insert or of each insert engages the outer circumferential surface of the end region, or of the respective end region, of the inner part.

According to one aspect of the invention, a joint is arranged in each instance on the axial end portions of the axle pins. The chassis component is preferably mounted at the axial end portions of the axle pins by the joints so as to be swivelable around the swiveling axis relative to the steering knuckle support. The axial end portions of the axle pins advantageously extend, preferably in each instance, particularly axially, out of the hole openings and/or out of the mounting hole. Particularly for this reason, the hole openings and/or the mounting hole are/is preferably arranged, preferably axially, between the axial end portions.

The axial securing elements are formed, e.g., by stops which are connected, preferably fixedly, to the inner part, the axle pins being supported at these stops, particularly axially. For example, the stops extend radially away from the inner part. The axial securing elements preferably comprise the inserts and/or the additional element or additional elements. The axial securing elements are preferably formed by the inserts and/or by the additional element or additional elements, or vice versa. For example, the inserts are formed by axial projections which are provided at the axial securing elements and/or at the stops, and, e.g., stop surfaces at which the axle pins are supported, particularly axially, extend radially away from the axial projections.

A rotary encoder is preferably provided, by which the rotation of the chassis component around the swiveling axis relative to the steering knuckle support can be detected. For example, the rotary encoder is coupled to the inner part and/or to one of the axle pins and/or to one of the inserts and/or to the additional element or to one of the additional elements and/or to one of the joints.

The chassis component is, e.g., a chassis link such as a control arm, for example. The chassis component is preferably a steering knuckle, also referred to as a wheel carrier. Preferably, a vehicle wheel is provided and is mounted on the steering knuckle to be rotatable around a wheel rotation axis. At least one chassis link or two or more chassis links are advantageously provided, by which the steering knuckle support is connected to a chassis frame, particularly in an articulated manner and/or movably, or which chassis link or chassis links connects or connect the steering knuckle support to a chassis frame, particularly in an articulated manner and/or movably. The chassis link or each chassis link is preferably a control arm.

BRIEF DESCRIPTION OF DRAWINGS

The invention will be described in the following with reference to a preferred embodiment form referring to the drawings. The drawings show.

DETAILED DESCRIPTION OF THE PRESENTLY PREFERRED EMBODIMENTS

Figure 5:
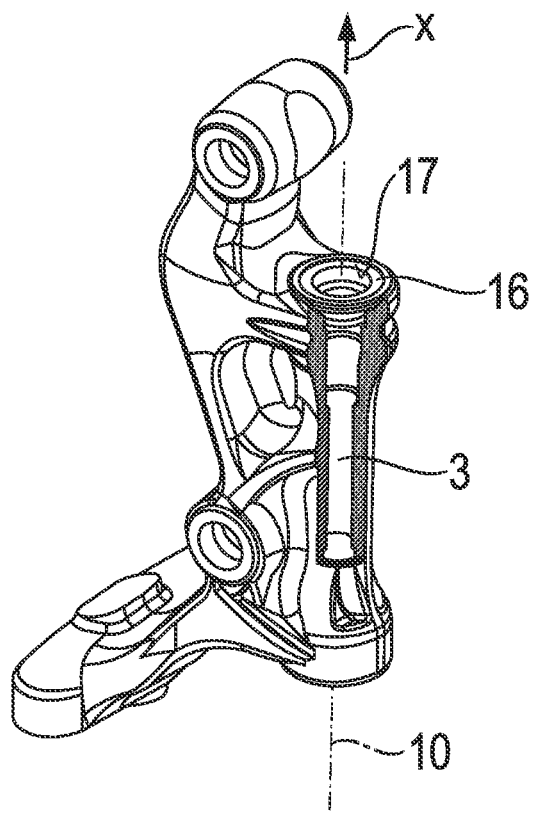
FIG. 5 is a partial sectional view of the steering knuckle support in a detail view.
Figure 6:
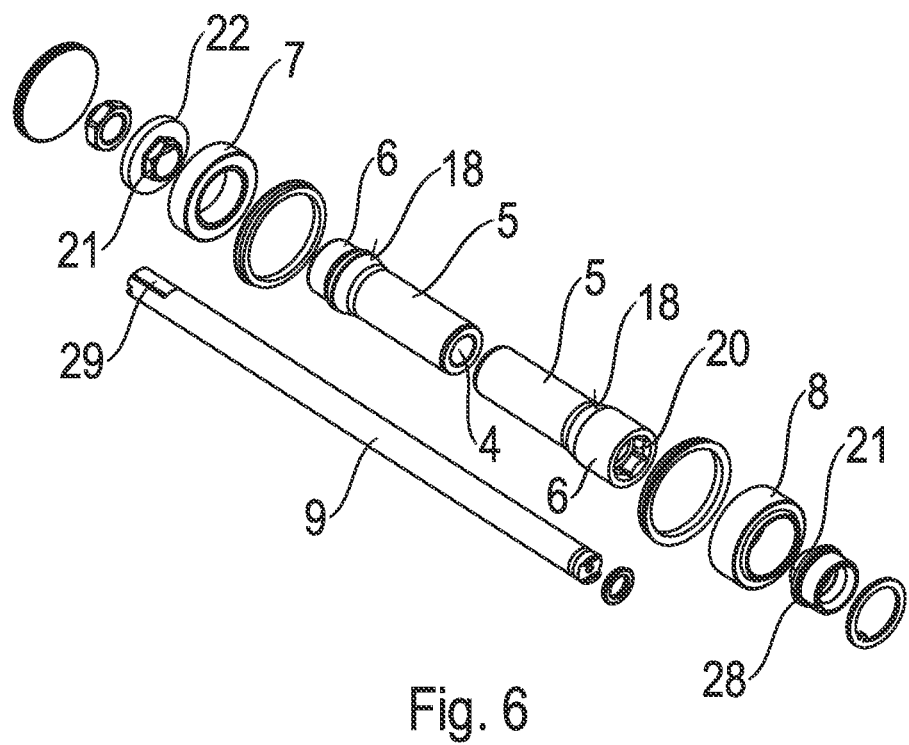
FIG. 6 is a view of a quantity of components which serve for articulating a steering knuckle to the steering knuckle support.

Different views and partial views of a wheel suspension 1 according to one aspect of the invention are shown in FIGS. 1 to 4. The wheel suspension 1 has a steering knuckle support 2 in which is provided a mounting hole 3 which extends in an axial direction x and is formed as a through-hole. Further, the wheel suspension 1 has two axle pins 5, which are arranged axially spaced apart, extend in axial direction x, have in each instance an axially through-going cavity 4 and are screwed into the mounting hole 3, these axle pins 5 extending out of the mounting hole 3 in each instance by an axial end portion 6. A joint 7, 8 is arranged in each instance on the axial end portions 6. Further, the wheel suspension 1 has an inner part 9 which extends in axial direction x through the through-going cavities 4 of the axle pins 5, a steering knuckle 27 which is mounted to be swivelable around a swiveling axis 10 extending in axial direction x relative to the steering knuckle support 2 by the joints 7 and 8 at the axial end portions 6 of the axle pins 5, and a vehicle wheel 11, which is mounted at the steering knuckle 27 to be rotatable around a wheel rotation axis 12. The steering knuckle support 2 is connected to a chassis frame 15 of a vehicle via two control arms 13 and 14 which can be seen from the detail view in FIG. 5. Further, a plurality of component parts, e.g., the axle pins 5, the joints 7 and 8 and the inner part 9, are shown in FIG. 6.

The axial ends of the mounting hole 3 form hole openings into which, in each instance, a conical washer 16 is inserted, a first contact area with a conical inner circumferential surface 17 being provided at the latter. The conical inner circumferential surfaces 17 of the first contact areas narrow in diameter toward one another in axial direction x. The axle pins 5 further have a second contact area with a conical outer circumferential surface 18. The conical outer circumferential surfaces 18 of the second contact areas narrow in diameter toward one another in axial direction x and contact the conical inner circumferential surfaces 17 of the first contact areas. Further, the conical washers 16 have, in each instance, at their axial ends facing one another a cylindrical tube portion 19 which contacts the steering knuckle support 2 inside the mounting hole 3 by its outer circumferential surface and the respective axle pin 5 by its inner circumferential surface.

Figure 1:
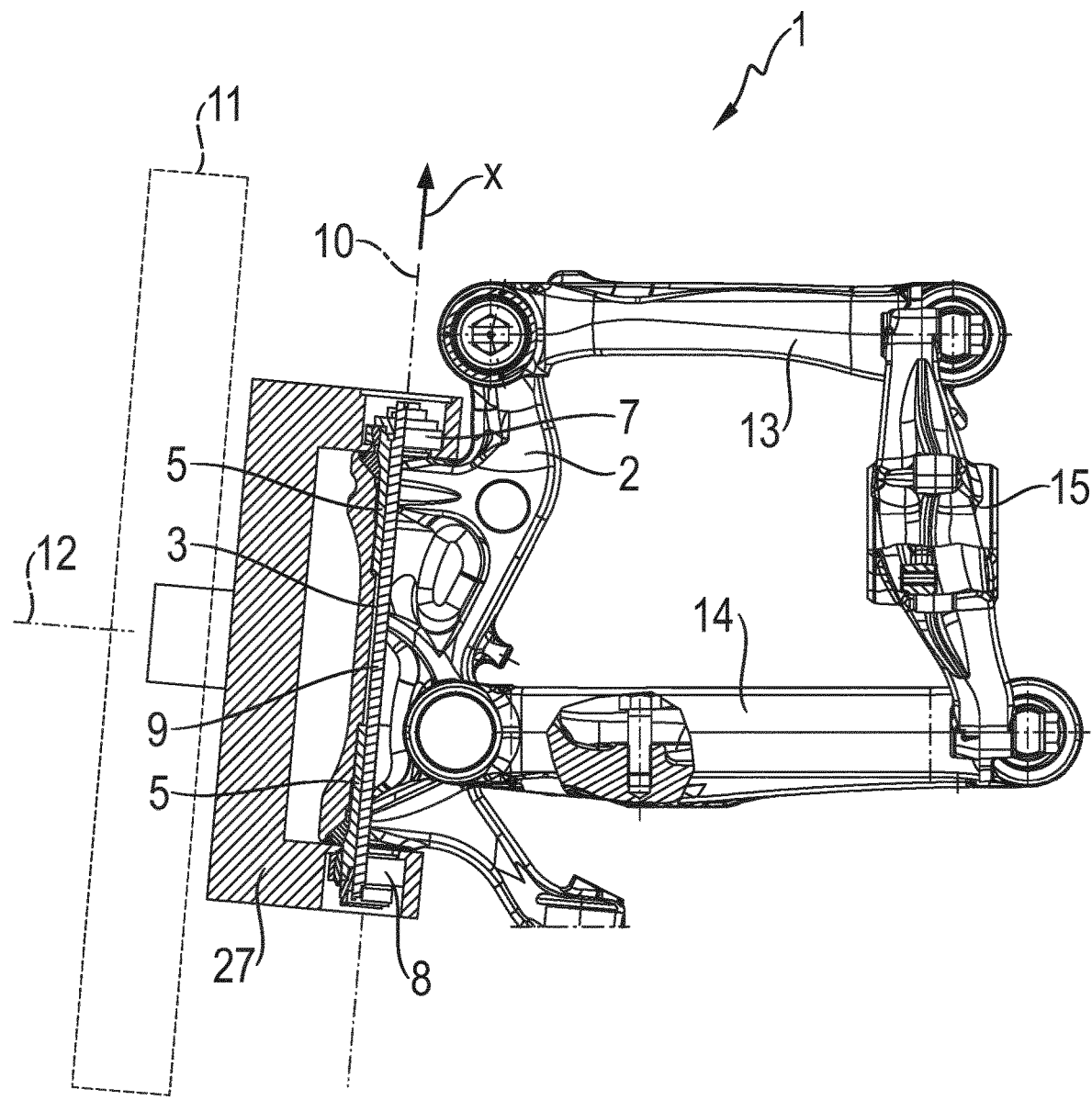
FIG. 1 is a partial sectional view of a wheel suspension.
Figure 2:
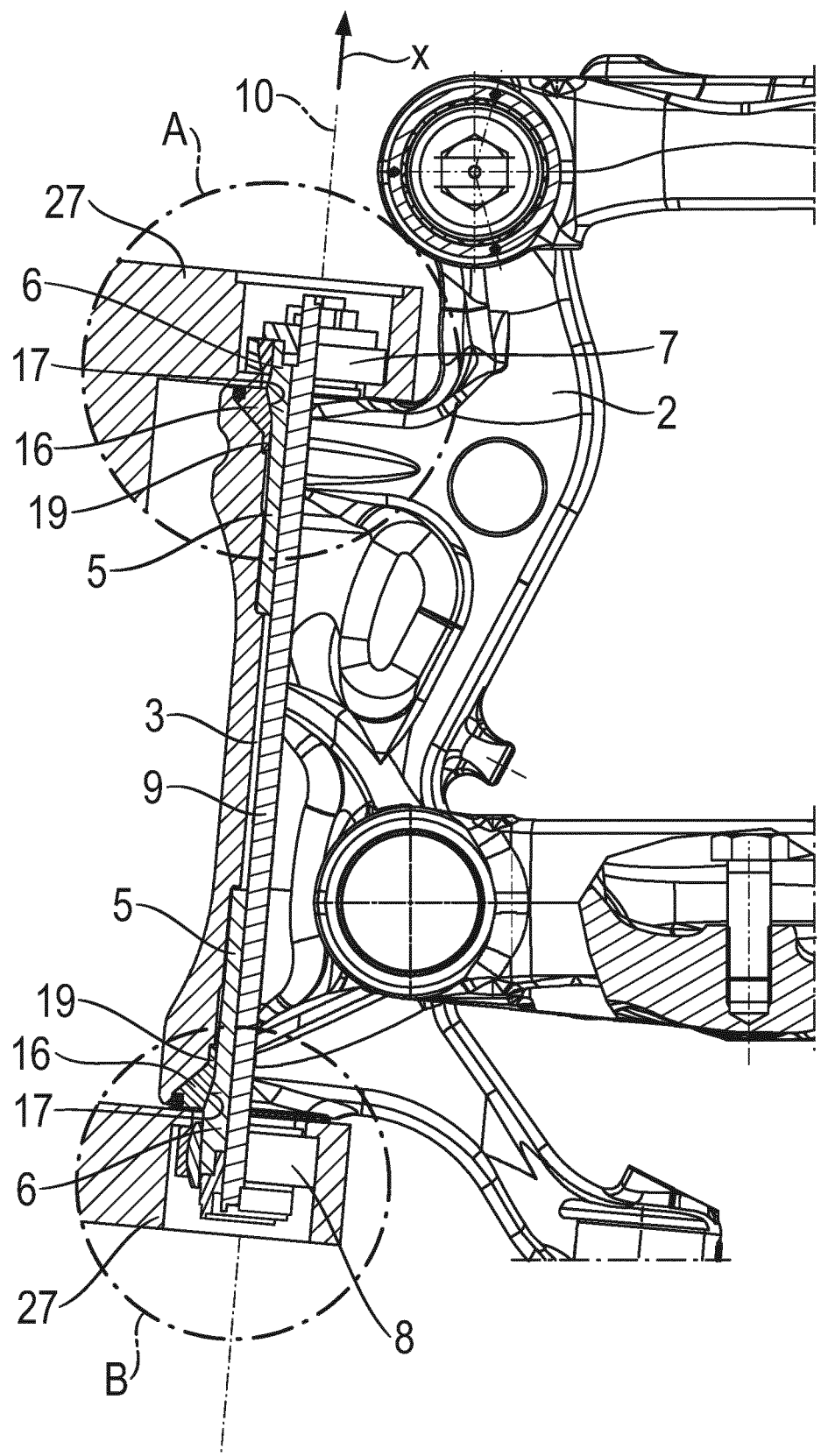
FIG. 2 is a section from FIG. 1 with a steering knuckle support.
Figure 3:
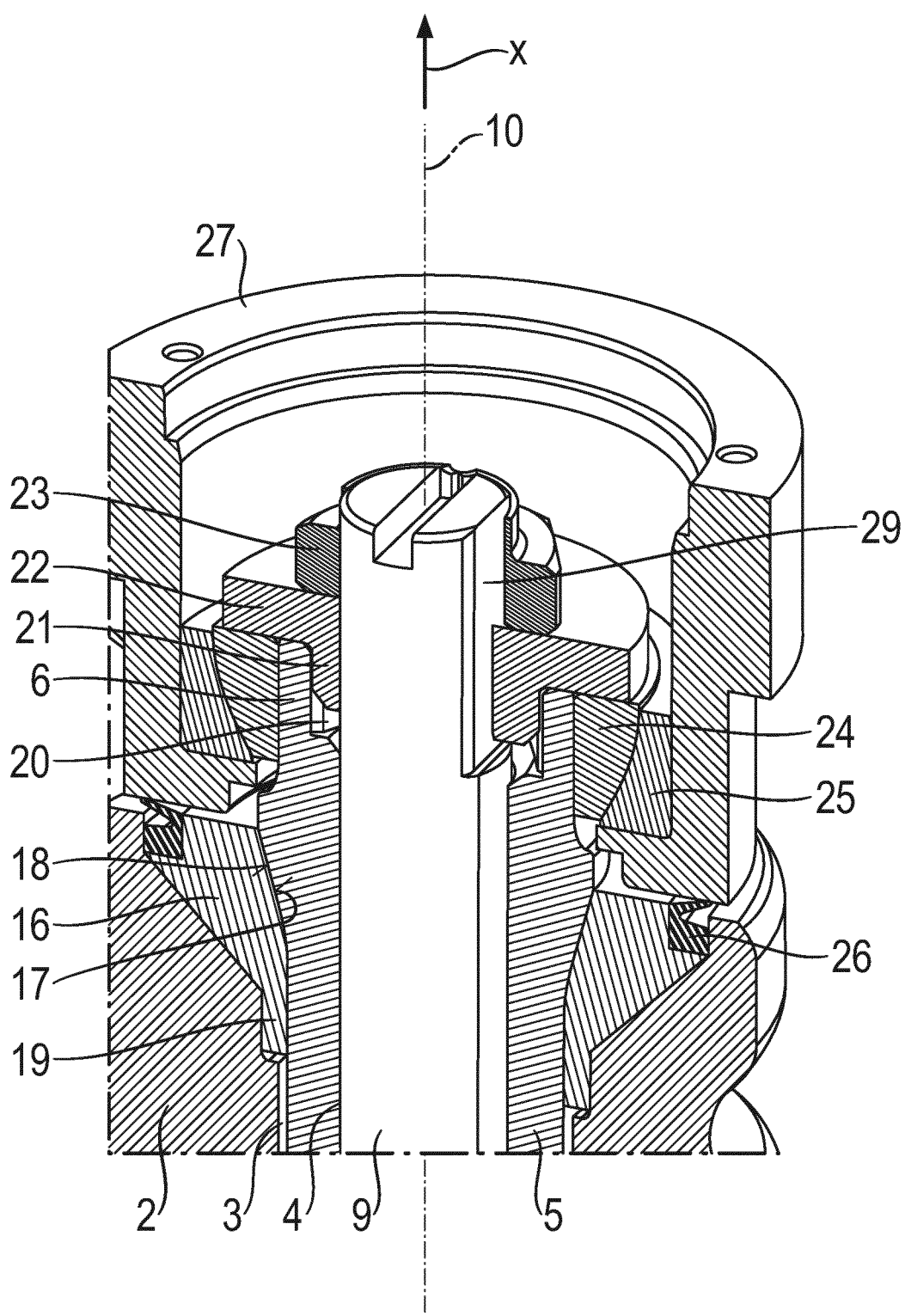
FIG. 3 is a sectional view of an area of the wheel suspension identified by A in FIG. 2.

FIG. 3 shows a sectional view of an area of the wheel suspension 1 identified by A in FIG. 2. A recess 20 with an inner circumferential surface, which is hexagonal in cross section, is provided in the front side of the axial end portion 6 of the axle pin 5. A correspondingly shaped outer circumferential surface of an insert 21 inserted into the recess 20 and surrounds the inner part 9 engages at this inner circumferential surface. The insert 21 is provided as an axial projection at an annular disk 22 and is formed integral with and/or is rigidly connected to this annular disk 22. Accordingly, the axle pin 5 is connected to the insert 21 and/or to the annular disk 22 so as to be rigid against rotation. The outer circumferential surface of the inner part 9 further has a flat portion 29 at which the inner circumferential surface of the annular disk 22 and/or of the insert 21 engages by a flat portion. The inner part 9 is therefore connected to the annular disk 22 and/or the insert 21 so as to be rigid against rotation. Further, a nut 23 by which the annular disk 22 is fixed in position with the insert 21 is screwed on to the end of the inner part 9. The annular disk 22 axially contacts the front side of the axial end portion 6 of the axle pin 5. An inner joint part 24 of the joint 7 is supported on the axial end portion 6 of the axle pin 5 and is fixed to the latter by the annular disk 22. The inner joint part 24 is supported moveably in an outer joint part 25 of the joint 7, the outer joint part 25 being fixedly connected to the steering knuckle 27. Further, a sealing ring 26 is provided which seals the conical washer 16 relative to the steering knuckle 27. The sealing ring 26 is carried in a recess incorporated in a front side of the conical washer 16 remote of the mounting hole 3.

Figure 4:
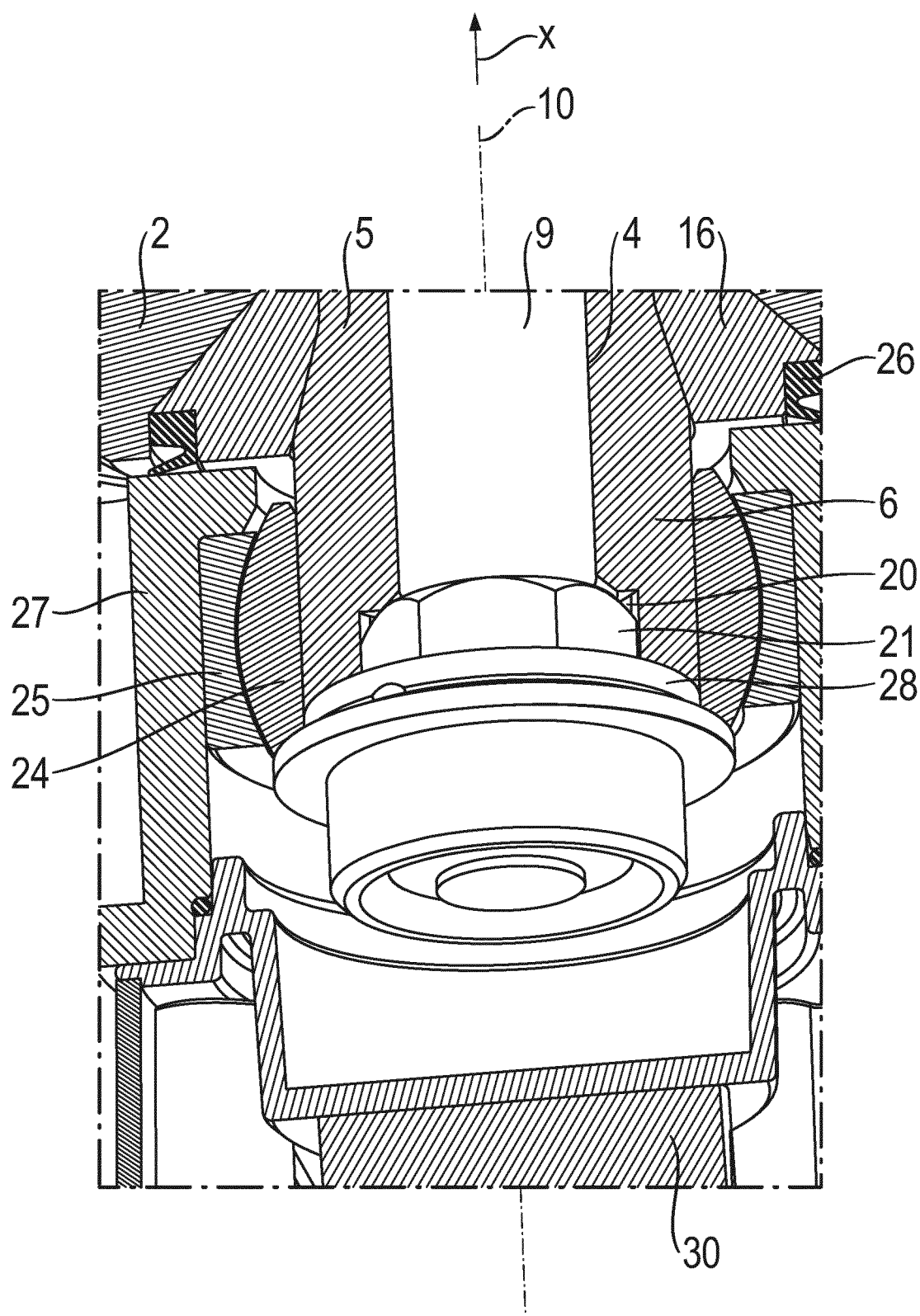
FIG. 4 is a sectional view of an area of the wheel suspension identified by B in FIG. 2.

FIG. 4 shows a sectional view of an area of the wheel suspension 1 identified by B in FIG. 2. A recess 20 with an inner circumferential surface which is hexagonal in cross section is provided in the front side of the axial end portion 6 of the axle pin 5. A correspondingly shaped outer circumferential surface of an insert 21, which is inserted into the recess 20 and surrounds the inner part 9 engages at this inner circumferential surface. The insert 21 is provided as an axial projection at an annular body 28 and is formed integral with and/or is rigidly connected to this annular body 28. Accordingly, the axle pin 5 is connected to the insert 21 and/or to the annular body 28 so as to be rigid against rotation. Further, the annular body 28 is axially fixed in position. The annular body 28 axially contacts the front side of the axial end portion 6 of the axle pin 5. An inner joint part 24 of the joint 8 is supported on the axial end portion 6 of the axle pin 5 and is fixed to the latter. An inner joint part 24 of the joint 8 is supported on the axial end portion 6 of the axle pin 5 and is fixed to the latter. The inner joint part 24 is movably supported in an outer joint part 25 of the joint 8, the outer joint part 25 being fixedly connected to the steering knuckle 27. Further, a sealing ring 26 is provided that seals the conical washer 16 relative to the steering knuckle 27. The sealing ring 26 is carried in particular in a recess incorporated in a front side of the conical washer 16 remote of the mounting hole 3. Further, a rotary encoder 30 is coupled to the inner part 9 and/or the annular body 28. The rotation of the steering knuckle 27 around the swiveling axis 10 relative to the steering knuckle support 2 can be detected the rotary encoder 30.

The annular disk 22, which is axially fixed to the inner part 9, and the annular body 28, which is axially fixed to the inner part 9, in each instance form axial securing elements, the axle pins 5 being arranged between the axial securing elements and accordingly secured at the inner part 9 in axial direction x via positive engagement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A wheel suspension for a vehicle, comprising:
   a steering knuckle support provided two hole openings that are opposed to one another in an axial direction and form openings of at least one mounting hole which is provided in the steering knuckle support and which extends in axial direction;
   two axle pins that are axially spaced apart extend in the axial direction and engage in the at least one mounting hole through the hole openings;
   a chassis component supported at axial end portions of the two axle pins to be swivelable relative to the steering knuckle support around a swiveling axis extending in the axial direction;
   respective conical washers configured to form a respective first contact area at each hole opening and each having a conical inner circumferential surface, wherein the conical inner circumferential surfaces of each respective first contact areas narrow in diameter toward one another in axial direction
   wherein the conical washers each have a cylindrical tube portion at their respective axial ends which face one another, which cylindrical tube portion, inside the at least one mounting hole, contacts the steering knuckle support by its outer circumferential surface and contacts the respective axle pin by its inner circumferential surface; and
   a respective second contact area with a conical outer circumferential surface of each of the two axle pins have a conical outer circumferential surface, wherein the conical outer circumferential surfaces of each respective second contact areas narrow in diameter toward one another in axial direction and contact the conical inner circumferential surfaces of the first contact areas.

2. The wheel suspension according to claim 1, wherein the first contact areas are formed by the conical washers inserted into the hole openings and at which the conical inner circumferential surfaces are provided.

3. The wheel suspension according to claim 2, wherein each of the conical washers is connected to the steering knuckle support so as to be rigid against rotation with respect to the swiveling axis.

4. The wheel suspension according to claim 2, wherein the conical washers each have a cylindrical tube portion at their respective axial ends which face one another, which cylindrical tube portion, inside the at least one mounting hole, contacts the steering knuckle support by its outer circumferential surface and contacts the respective axle pin by its inner circumferential surface.

5. The wheel suspension according to claim 1, wherein the two axle pins have threads on their radially outer surface by which they are screwed into the at least one mounting hole.

6. The wheel suspension according to claim 1, wherein the at least one mounting hole is a through-hole, the two axle pins each have an axially through-going cavity, and an inner part is provided that extends in axial direction through the axially through-going cavities.

7. The wheel suspension according to claim 6, wherein two axial securing elements are provided at the inner part, the two axle pins being arranged therebetween and secured to the inner part in axial direction by positive engagement.

8. The wheel suspension according to claim 6, wherein the inner part is connected to one of the two axle pins to be rigid against rotation.

9. The wheel suspension according to claim 6, wherein a recess with an inner circumferential surface, which is non-round in cross section, is provided in each instance in front sides of the end portions of the two axle pins, this inner circumferential surface being engaged by a correspondingly shaped outer circumferential surface of an insert that is inserted into the recess, surrounds the inner part and is connected to the inner part to be rigid against rotation.

10. The wheel suspension according to claim 9, wherein a respective joint is arranged on the end portions of each of the two axle pins, wherein the chassis component is mounted at the end portions of the two axle pins by the respective joints to be swivelable around the swiveling axis relative to the steering knuckle support.

11. The wheel suspension according to claim 1, wherein the chassis component is a steering knuckle.

12. The wheel suspension according to claim 11, wherein a vehicle wheel is mounted on the steering knuckle to be rotatable around a wheel rotation axis.

13. The wheel suspension according to claim 1, wherein a plurality of chassis links connect the steering knuckle support to a chassis frame.

\* \* \* \* \*